(12) United States Patent
Lee et al.

(10) Patent No.: US 7,830,599 B2
(45) Date of Patent: Nov. 9, 2010

(54) PROJECTION-TYPE DISPLAY APPARATUS AND DISPLAY METHOD THEREOF

(75) Inventors: Jong-soo Lee, Cheonan-si (KR); Kee-uk Jeon, Seoul (KR); Kwan-heung Kim, Suwon-si (KR); Jung-hyeon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 12/164,571

(22) Filed: Jun. 30, 2008

(65) Prior Publication Data

US 2009/0153957 A1    Jun. 18, 2009

(30) Foreign Application Priority Data

Dec. 14, 2007   (KR) .................. 10-2007-0131063

(51) Int. Cl.
*G03B 21/56* (2006.01)
*B29D 11/00* (2006.01)

(52) U.S. Cl. .................... 359/449; 353/77; 353/98; 264/1.9

(58) Field of Classification Search ................ 359/449; 353/71, 76–77, 98; 264/1.9
See application file for complete search history.

(56) References Cited

U.S. PATENT DOCUMENTS

| | | | | |
|---|---|---|---|---|
| 3,840,417 A * | 10/1974 | Yager | .................. | 156/242 |
| 4,229,085 A * | 10/1980 | Yamada et al. | .................. | 353/75 |
| 6,543,903 B2 * | 4/2003 | Akimoto et al. | .................. | 359/883 |
| 7,572,014 B2 * | 8/2009 | Suzuki et al. | .................. | 353/77 |

* cited by examiner

*Primary Examiner*—Christopher Mahoney
(74) *Attorney, Agent, or Firm*—Sughrue Mion, PLLC

(57) ABSTRACT

A projection-type display apparatus and a display method thereof are disclosed, the projection-type display apparatus including a coated portion which is formed on a surface of a substrate, and which scans a video onto a screen, and a patterned portion which is formed on another surface of the substrate in a serrated pattern, wherein the serrated pattern is formed on the substrate according to the surface area of the patterned portion and the depth of the serrated pattern. A serrated pattern is formed on a substrate forming a reflective portion to reflect a video on a screen, so the cooling surface area of the substrate is increased, thereby compensating for distortions in video scanned onto the screen.

18 Claims, 3 Drawing Sheets

PROJECTION-TYPE DISPLAY APPARATUS AND DISPLAY METHOD THEREOF

CROSS-REFERENCE TO RELATED APPLICATIONS

This application claims priority under 35 U.S.C. §119 from Korean Patent Application No. 10-2007-0131063, filed on Dec. 14, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to a projection-type display, and more particularly, to a projection-type display apparatus in which the surface area of a substrate forming a reflection unit varies as to prevent deformation when the temperature rises, and a display method thereof.

2. Description of the Related Art

A display apparatus projects a video signal including red, green, and blue (R, G, B) color signals onto a screen to display a video. Cathode ray tube (CRT) display apparatuses were widely used in the past, but more recently, a projection-type display apparatus has become more widely used. Digital light processing (DLP) display apparatuses have been developed as a third generation of projection apparatuses.

DLP display apparatuses use a semiconductor chip known as a digital micromirror device (DMD) including more than 1.3 million mirrors, in which each mirror is capable of being controlled, separately. The projection-type display apparatus adjusts a slant angle of the DMD, and projects a ray consisting of R, G, B rays corresponding to a desired color onto a projection lens to display a video. The light emitted from the DMD, that is the video, is adjusted by a reflection unit to fit to the size of a screen, and is displayed on the screen. The reflection unit includes a projection lens, projection mirror, and glass. A surface of a plastic substrate is coated with mirrors to form the reflection unit.

A related art DLP display apparatus reflects a video output from a DMD using a reflection unit and displays the video on a screen. The reflection unit absorbs a part of the light reflected therefrom, causing the temperature of the substrate to rise, and the area of the substrate to expand. Consequently, the surface area of the substrate varies, and the direction of the light reflected from the reflection unit to the screen is changed. That is, a focus of the video scanned from the DMD onto the screen is changed by the reflection unit.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

The present invention provides a projection-type display apparatus to prevent deformation of a substrate forming a reflection unit, and a display method thereof.

According to an exemplary aspect of the present invention, there is provided a projection-type display apparatus, including a reflective portion which magnifies a video and scans the magnified video onto a screen; a coated portion which is formed on a surface of a substrate forming the reflective portion, and which reflects the video; and a patterned portion which is formed on another surface of the substrate, and on which a serrated pattern is formed, wherein the patterned portion is integrally formed with the substrate, and is formed on the substrate in the serrated pattern having a surface area larger than a predetermined area of the patterned portion and a depth lower than a predetermined depth according to predetermined pattern information indicating the pattern of the substrate.

The serrated pattern may form a surface of the substrate, and may be integrally formed with the substrate.

The pattern information may include at least two of a predetermined length, depth, and angle of the serrated pattern.

The length of the serrated pattern may be determined according to the predetermined depth of the substrate, and a predetermined reference ratio.

The angle of the serrated pattern may be determined by calculating an arctangent of a value dividing the depth of the serrated pattern into a half of the length of the serrated pattern.

The angle of the serrated pattern formed on the patterned portion may be between predetermined first and second reference angles.

If the angle of the serrated pattern is less than the predetermined first reference angle, or more than the predetermined second reference, the serrated pattern may be formed on the substrate at a serrated pattern angle determined by adjusting one of the depth of the serrated pattern and a predetermined reference ratio.

The angle of the serrated pattern included in the pattern information may be equal to or more than 45 degrees, and equal to or less than 60 degrees.

The length of the serrated pattern included in the pattern information may be between 50 μm and 500 μm.

The substrate may be made of plastic.

The apparatus may further include a broadcast reception unit which tunes to a broadcast signal transmitted from a broadcasting station, demodulates the tuned broadcast signal, and corrects errors in the broadcast signal; a signal processing unit which separates the broadcast signal demodulated by the broadcast reception unit into video data and audio data; and a digital micro mirror device (DMD) which reflects the video data provided from the signal processing unit onto a micro mirror, and outputs a video, wherein the reflective portion magnifies the video output from the DMD, and scans the magnified video onto a screen.

According to an exemplary aspect of the present invention, there is provided a method for manufacturing a substrate of a projection-type display apparatus, the method including fabricating a coating material capable of reflecting a video on a surface of a substrate comprising a projection material which magnifies the video, and scans the magnified video onto a screen; and forming a serrated pattern having a surface area larger than a predetermined area and a depth lower than a predetermined depth on another surface of the substrate.

The serrated pattern may form a surface of the substrate, and may be integrally formed with the substrate.

The serrated pattern may be formed on the other surface of the substrate using at least two of the length, depth, and angle of a predetermined serrated pattern.

The length of the serrated pattern may be determined according to the predetermined depth of the substrate, and a predetermined reference ratio, and may be equal to or more than a predetermined critical value.

The angle of the serrated pattern may be determined by calculating an arctangent of a value dividing the depth of the serrated pattern into a half of the length of the serrated pattern.

The angle of the serrated pattern may be equal to or more than degrees, and equal to or less than 60 degrees.

The length of the serrated pattern may be between 50 μm and 500 μm.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
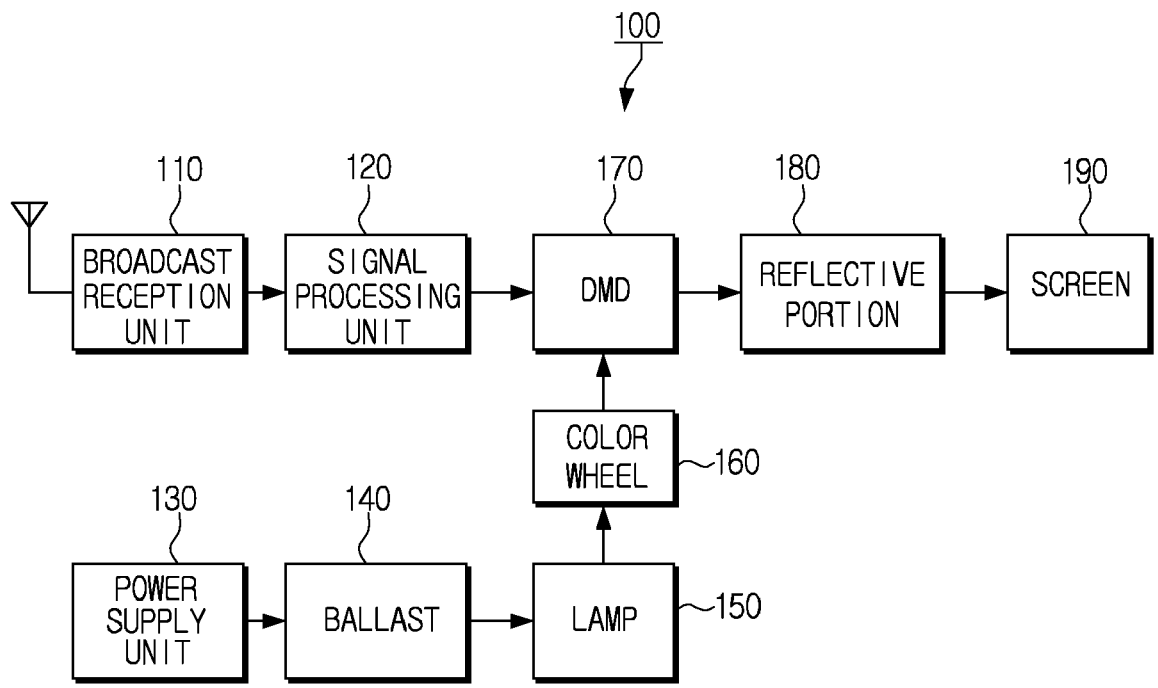
FIG. 1 is a block diagram illustrating a projection-type display apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the present invention can be carried out without those specifically defined matters. Also, well-known functions or constructions are not described in detail since they would obscure the invention with unnecessary detail.

FIG. 1 is a block diagram illustrating a projection-type display apparatus according to an exemplary embodiment of the present invention.

Referring to FIG. 1, a projection-type display apparatus 100 according to an exemplary embodiment of the present invention may comprise a broadcast reception unit 110, a signal processing unit 120, a power supply unit 130, a ballast 140, a lamp 150, a color wheel 160, a digital micro mirror device (DMD) 170, a reflective portion 180, and a screen 190.

The broadcast reception unit 110 comprises a tuner which tunes to a broadcast signal transmitted from a broadcasting station, and a demodulator which demodulates the tuned broadcast signal and corrects errors in the broadcast signal.

The signal processing unit 120 separates a broadcast signal tuned by the broadcast reception unit 110 into video data, audio data, and various additional forms of data such as program and service information protocol (PSIP) data.

The signal processing unit 120 decodes the separated audio data, processes a signal of the decoded audio data to meet a standard of a speaker (not shown), and outputs the processed audio signal. The signal processing unit 120 decodes the separated video data, converts the decoded video data into a format for driving the DMD 170, and outputs the converted video data.

The power supply unit 130 receives the AC power from an external source, and supplies the AC power to the components of the DLP display apparatus 100.

The ballast 140 converts the AC power input from the power supply unit 130 into a second power supply to drive the lamp 150, and outputs the converted AC power to the lamp 150.

The lamp 150 emits white light based on the second power supplied by the ballast 140.

The color wheel 160 comprises filters through which rays of red (R), green (G), blue (B) wave lengths are each transmitted. The color wheel 160 rotates, and the R, G, B filters are thereby positioned on a ray path in an alternate order, and each filter outputs the white light emitted from the lamp 150 as R, G, B colors. That is, if the color wheel 160 rotates once, images correspond to each color overlap, and a video frame is generated.

The DMD 170 is composed of approximately 1.3 million micro mirrors, and outputs the video data provided from the signal processing unit 120 to the reflective portion 180. The DMD 170 reflects R, G, B colors output from the color wheel 160 on the micro mirrors, and outputs the R, G, B colors.

In specific, the DMD 170 reflects the video data provided from the signal processing unit 120, and R, G, B colors output from the color wheel 160 on the micro mirrors. The reflected video is enlarged through the reflective portion 180, and displayed on the screen 190.

Figure 2:
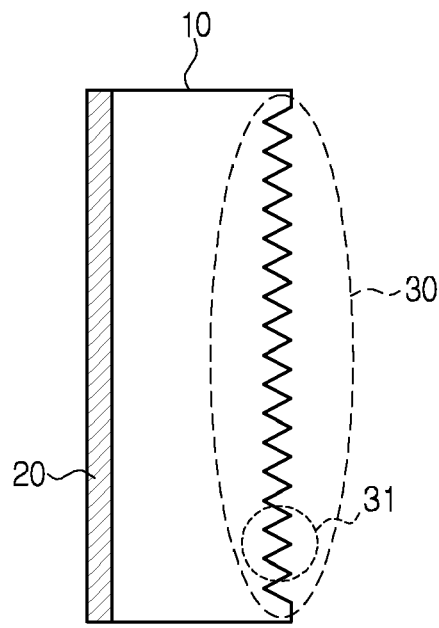
FIGS. 2 and 3 are views illustrating a serrated pattern which is formed on a substrate forming a reflective portion according to an exemplary embodiment of the present invention.

The reflective portion 180 enlarges the video input from the DMD 170 through a lens in order to fit to the size of the screen 190, reflects the enlarged video, and displays the reflected video on the screen 190. Referring to FIG. 2, the reflective portion 180 consists of a coated portion 20 in which a surface of a substrate 10 is coated with aluminum or mirror, and a patterned portion 30 in which a serrated pattern is formed on a surface opposite the substrate 10 according to pattern information.

The pattern information includes at least two of the length (L) of a predetermined serrated pattern, the depth (D) of the serrated pattern, and the angle of the serrated pattern. A V-shaped pattern 31 is shown in FIG. 2 as an example of the serrated pattern. The serrated pattern is formed on a surface of the substrate 10, and is integrally formed with the substrate 10. The coated portion 20 is formed by coating a surface of the substrate 10 with a material such as a mirror, and the patterned portion 30 is formed by carving a serrated pattern having a V shape on a surface opposite the substrate 10.

Figure 3:
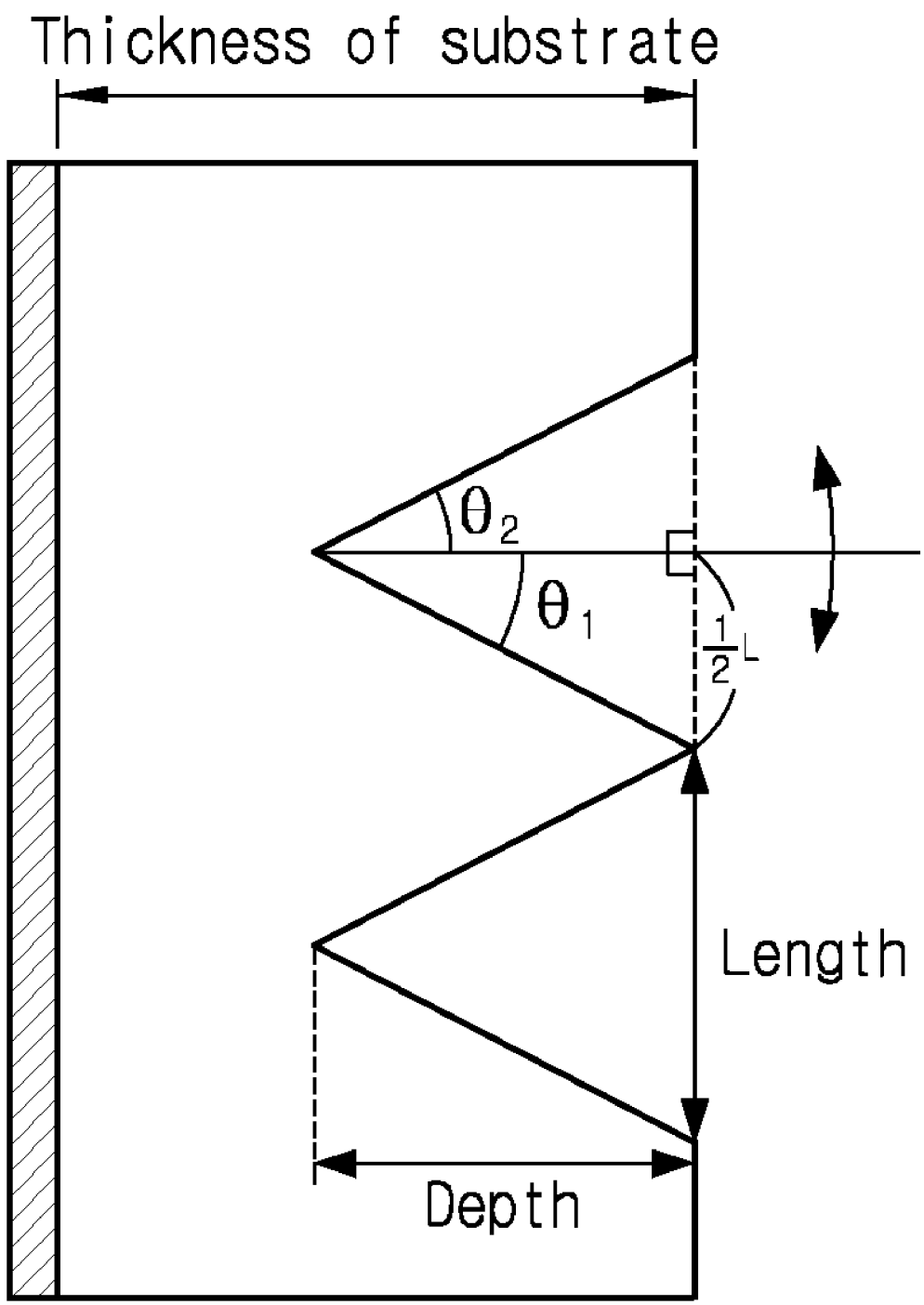

Referring to FIG. 3, the serrated pattern of the substrate 10 is formed according to the length (L), depth (D), and angles $(\theta_1, \theta_2)$. The length (L) of the serrated pattern is determined according to the thickness (T) of the substrate 10 and a predetermined reference ratio ($\alpha$), and the depth (D) of the serrated pattern is more than the first critical value (th1). For example, the serrated pattern formed on the substrate 10 may have a length (L) ranging from 50 μm to 500 μm.

The first angle ($\theta_1$) of the serrated pattern is determined according to the length (L) and depth (D) of the serrated pattern, and the second angle ($\theta_2$) of the serrated pattern is identical to the first angle ($\theta_1$). The first and second angles $(\theta_1, \theta_2)$ are equal to or greater than the first reference angle ($\theta_{th1}$), and equal to or less than the second reference angle ($\theta_{th2}$). The first and second reference angles ($\theta_{th1}, \theta_{th2}$) may be preset at 45 degrees and 60 degrees, respectively. If the depth (D) of the serrated pattern is low, and the surface area (S) of the substrate 10 having the serrated pattern is wide, the cooling efficiency of the substrate 10 is excellent.

If the first and second angles $(\theta_1, \theta_2)$ are not equal to or greater than the first reference angle ($\theta_{th1}$), or not equal to or less than the second reference angle ($\theta$th2), respectively, that is if the first and second angles $(\theta_1, \theta_2)$ are less than the first reference angle ($\theta_{th1}$), or greater than the second reference angle ($\theta_{th2}$), respectively, the reference ratio ($\alpha$) and depth (D) are adjusted until the first and second angles ($\theta_1,\theta_2$) belong between the first and second reference angles ($\theta_{th1}$, $\theta_{th2}$). The serrated pattern of FIG. 3 is formed according to the determined depth (D), length (L), and the first and second angles ($\theta_1,\theta_2$).

Hereinbelow, a method for forming a serrated pattern on a substrate will be explained in detail with reference to FIG. 4.

Figure 4:
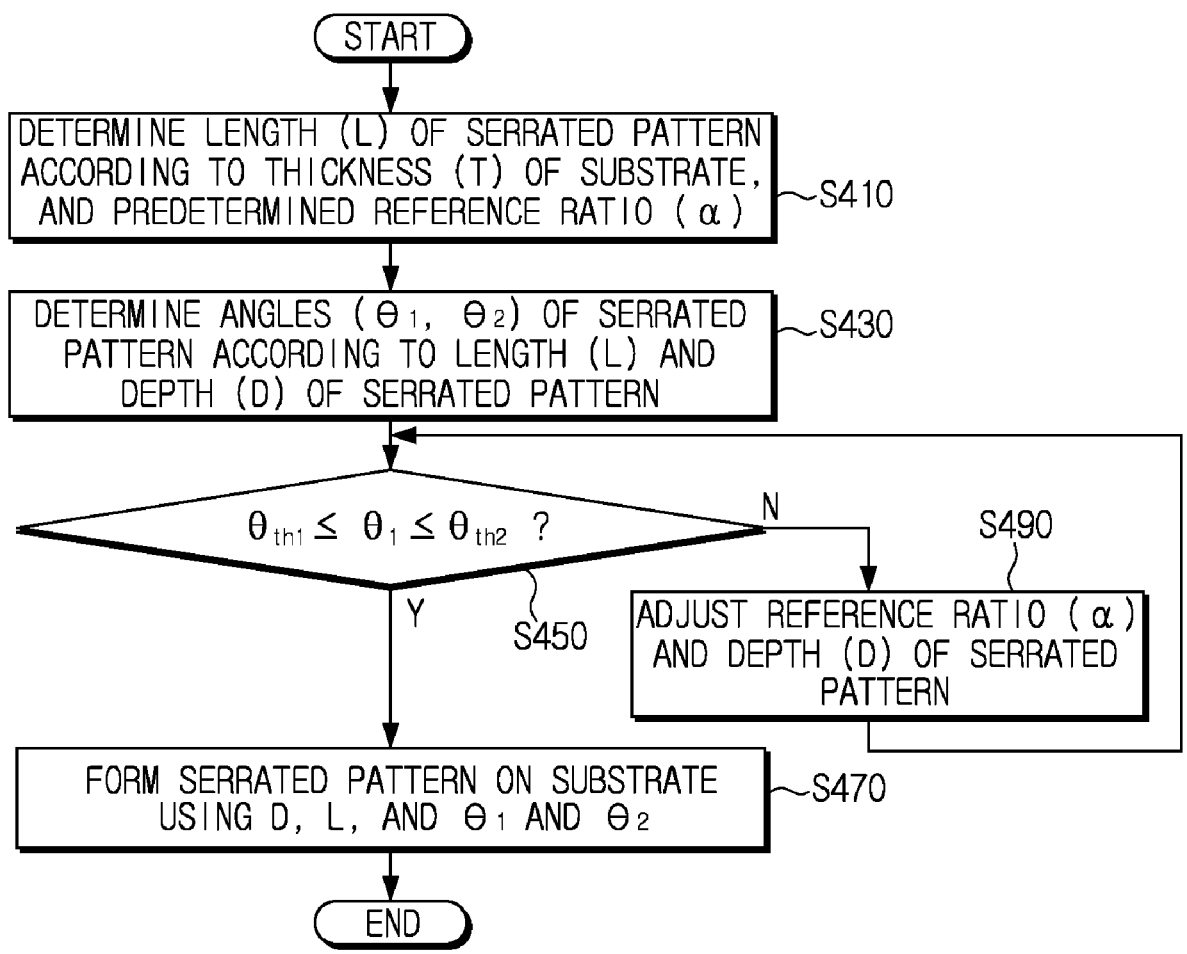
FIG. 4 is a flowchart illustrating a method for manufacturing a reflective portion having a serrated pattern in a projection-type display apparatus according to an exemplary embodiment of the present invention.

FIG. 4 is a flowchart illustrating a method for manufacturing a reflective portion having a serrated pattern in a projection-type display apparatus according to an exemplary embodiment of the present invention.

Referring to FIG. 4, the length (L) of the serrated pattern which is formed on a surface of the reflective portion 180 is determined according to the thickness (T) of a preset substrate 10, and a predetermined reference ratio ($\alpha$) (S410).

For example, if the thickness (T) of the substrate 10 is preset at 1000 μm, and the reference ratio ($\alpha$) is preset at 10%, the length (L) of the serrated pattern is determined to be the reference ratio of 10% of the thickness (T) of 1000 μm, that is, 100 μm.

First and second angles ($\theta_1,\theta_2$) are determined according to the determined length (L) and depth (D) of the serrated pattern (S430). The depth (D) of the serrated pattern is preferably the lowest value greater than a predetermined critical value (th1). The ideal value of the depth (D) of the serrated pattern is equal to the first critical value (th1), the angles ($\theta_1,\theta_2$) of the serrated pattern as the depth (D) is adjusted from the first critical value (th1).

For example, if the first critical value (th1) is preset at 50 μm, the first angle ($\theta_1$) of the serrated pattern is determined to be 45 degrees by using the trigonometric function $$\tan\theta_1 = \frac{(1/2)L}{D} = \frac{50\ \mu m}{50\ \mu m} = 1,$$

since the depth (D) of the serrated pattern is determined to be 50 μm, and the length (L) is determined to be 100 μm in operation S410.

While the second angle ($\theta_2$) of the serrated pattern is identical to the first angle ($\theta_1$), the present invention should not be considered to be limited to such a value. The second angle ($\theta_2$) may also be different from the first angle ($\theta_1$). In such a case, the second angle ($\theta_2$) may be between the predetermined first and second reference angles ($\theta_{th1},\theta_{th2}$).

If the first angle ($\theta_1$) is determined to be between the predetermined first and second reference angles ($\theta_{th1},\theta_{th2}$) (S450:Y), the serrated pattern is formed on the substrate 10 using the depth (D), length (L), and the first and second angles ($\theta_1,\theta_2$) of the serrated pattern (S470).

For example, if the first and second reference angles ($\theta_{th1}$, $\theta_{th2}$) are preset at 45 degrees and 60 degrees, respectively, the first angle ($\theta_1$) determined in operation S430, that is 45 degrees, is between the first and second reference angles ($\theta_{th1},\theta_{th2}$), so the first angle ($\theta_1$) is finally determined to be 45 degrees, and the second angle ($\theta_2$) is also determined to be 45 degrees, the same as the first angle ($\theta_1$). The serrated pattern having the first and second angles ($\theta_1,\theta_2$) of 45 degrees, depth (D) of 50 μm, and length (L) of 100 μm is formed on the substrate 10.

The serrated pattern is formed on the substrate 10 using at least two of the determined first and second angles ($\theta_1,\theta_2$) of 45 degrees, depth (D) of 50 μm, and length (L) of 100 μm. That is, the serrated pattern is formed on the substrate 10 using the depth (D) and length (L), the first and second angles ($\theta_1,\theta_2$) and depth (D), or the first and second angles ($\theta_1,\theta_2$) and length (L).

If the first angle ($\theta_1$) is not between the first and second reference angles ($\theta_{th1},\theta_{th2}$) (S450:N), at least one of the reference ratio ($\alpha$) and the depth (D) of the serrated pattern is adjusted to determine the first angle ($\theta_1$) between the first and second reference angles ($\theta_{th1},\theta_{th2}$) (S490).

For example, if the thickness (T) of the substrate 10 is preset at 1000 μm, the reference ratio ($\alpha$) is preset at 8%, and the first critical value (th1) is preset at 50 μm, the length (L) of the serrated pattern is determined to be 80 μm, and the depth (D) of the serrated pattern is determined to be 50 μm, so the first angle ($\theta_1$) is determined to be 39 degrees using the trigonometric function $$\tan\theta_1 = \frac{(1/2)L}{D} = \frac{40\ \mu m}{50\ \mu m} = 0.8.$$

As the first angle ($\theta_1$) of 39 degrees is not between the first and second reference angles ($\theta_{th1},\theta_{th2}$) of 45 degrees and 60 degrees in operation S450, either the reference ratio ($\alpha$) or the depth (D) of the serrated pattern is adjusted in a graduated manner.

More specifically, if the reference ratio ($\alpha$) is adjusted up to 9%, the first angle ($\theta_1$) is determined to be 42 degrees, which is not between the first and second reference angles ($\theta_{th1},\theta_{th2}$) of 45 and 60 degrees, so the reference ratio ($\alpha$) is re-adjusted up to 10%. In doing so, the first angle ($\theta_1$) is determined to be 45 degrees, which is between the first and second reference angles ($\theta_{th1},\theta_{th2}$) of 45 and 60 degrees. Accordingly, a serrated pattern having a first angle ($\theta_1$) of 45 degrees is formed on the substrate 10.

If the thickness (T) of the substrate 10 is preset at 1000 μm, the reference ratio ($\alpha$) is preset at 8%, and the first critical value (th1) is preset at 50 μm, the depth (D) of the serrated pattern is adjusted to be equal to or greater than the first critical value (th1) of 50 μm in a graduated manner.

If the depth (D) of the serrated pattern is adjusted up to 60 μm, the first angle ($\theta_1$) is determined to be 37 degrees, so the first angle ($\theta_1$) of 37 degrees is not between the first and second reference angles ($\theta_{th1},\theta_{th2}$) of 45 degrees and 60 degrees, respectively. Accordingly, the depth (D) of the serrated pattern is re-adjusted. If the depth (D) of the serrated pattern is adjusted up to 70 μm, the first angle ($\theta_1$) is determined to be 41 degrees, so the first angle ($\theta_1$) of 41 degrees is also not between the first and second reference angles ($\theta_{th1}$, $\theta_{th2}$) of 45 degrees and 60 degrees, respectively. Accordingly, the depth (D) of the serrated pattern is re-adjusted. If the depth (D) of the serrated pattern is adjusted up to 80 μm, the first angle ($\theta_1$) is determined to be 45 degrees, so the first angle ($\theta_1$) of 45 degrees is between the first and second reference angles ($\theta_{th1},\theta_{th2}$) of 45 degrees and 60 degrees, respectively.

The first angle ($\theta_1$) between the first and second reference angles ($\theta_{th1},\theta_{th2}$) of 45 degrees and 60 degrees, respectively, is determined by adjusting at least one of the depth (D) and the reference ratio ($\alpha$), and the second angle ($\theta_2$) is determined along with the first angle ($\theta_1$). Accordingly, the serrated pattern having the first and second angles ($\theta_1,\theta_2$) is formed on the substrate 10.

According to the projection display apparatus and the display method of the present invention, the reflective portion 180 may also be implemented using a substrate made of glass and plastic instead of a substrate made of lens and plastic. While the substrate is coated with aluminum or a mirror in the exemplary embodiment of the present invention, the substrate may also be coated with any other material capable of reflecting a video input from the DMD 170.

According to the projection display apparatus and the display method of the present invention, a serrated pattern is formed on a substrate according to pattern information, but this should not be considered limiting. Alternatively, the serrated pattern may be formed according to the depth (D) of the serrated pattern and the surface area of the patterned portion 30. That is, the serrated pattern may be formed on the substrate 10 using the depth (D), which is the lowest value equal to or more than a predetermined critical value, and the surface area of the patterned portion 30, which is the highest value equal to or less than a predetermined critical value.

As described above, a serrated pattern is formed on a substrate which is implemented as a reflective portion reflecting a video on a screen, so the cooling surface area of the substrate is increased, thereby compensating for distortion in video scanned onto the screen.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A projection-type display apparatus, comprising:
   a reflective portion which magnifies a video and scans the magnified video onto a screen;
   a coated portion which is formed on a surface of a substrate forming the reflective portion, and which reflects the video; and
   a patterned portion which is formed on another surface of the substrate, and on which a serrated pattern is formed, wherein the patterned portion is integrally formed with the substrate, and is formed on the substrate in the serrated pattern having a surface area larger than a predetermined area of the patterned portion and a depth lower than a predetermined depth according to predetermined pattern information indicating the pattern of the substrate.

2. The apparatus of claim 1, wherein the serrated pattern forms a surface of the substrate, and is integrally formed with the substrate.

3. The apparatus of claim 1, wherein the pattern information comprises at least two of a predetermined length, depth, and angle of the serrated pattern.

4. The apparatus of claim 3, wherein the length of the serrated pattern is determined according to the predetermined depth of the substrate, and a predetermined reference ratio.

5. The apparatus of claim 3, wherein the angle of the serrated pattern is determined by calculating an arctangent of a value dividing the depth of the serrated pattern into a half of the length of the serrated pattern.

6. The apparatus of claim 3, wherein the angle of the serrated pattern formed on the patterned portion is between a predetermined first reference angle and a predetermined second reference angle.

7. The apparatus of claim 6, wherein if the angle of the serrated pattern is less than the predetermined first reference angle, or more than the predetermined second reference angle, the serrated pattern is formed on the substrate at a serrated pattern angle determined by adjusting one of the depth of the serrated pattern and a predetermined reference ratio.

8. The apparatus of claim 1, wherein the angle of the serrated pattern comprised in the pattern information is equal to or more than 45 degrees, and equal to or less than 60 degrees.

9. The apparatus of claim 1, wherein the length of the serrated pattern comprised in the pattern information is between 50 μm and 500 μm.

10. The apparatus of claim 1, wherein the substrate is made of plastic.

11. The apparatus of claim 1, further comprising:
    a broadcast reception unit which tunes to a broadcast signal transmitted from a broadcasting station, demodulates the tuned broadcast signal, and corrects errors in the broadcast signal;
    a signal processing unit which separates the broadcast signal demodulated by the broadcast reception unit into video data and audio data; and
    a digital micro mirror device (DMD) which reflects the video data provided from the signal processing unit onto a micro mirror, and outputs a video,
    wherein the reflective portion magnifies the video output from the DMD, and scans the magnified video onto a screen.

12. A method for manufacturing a substrate of a projection-type display apparatus, the method comprising:
    fabricating a coating material capable of reflecting a video on a surface of a substrate comprising a projection material which magnifies the video, and scans the magnified video onto a screen; and
    forming a serrated pattern having a surface area larger than a predetermined area and a depth lower than a predetermined depth on another surface of the substrate.

13. The method of claim 12, wherein the serrated pattern is formed on the other surface of the substrate using at least two of the length, depth, and angle of a predetermined serrated pattern.

14. The method of claim 12, wherein the serrated pattern forms a surface of the substrate, and is integrally formed with the substrate.

15. The method of claim 14, wherein the length of the serrated pattern is determined according to the predetermined depth of the substrate, and a predetermined reference ratio, and is equal to or more than a predetermined critical value.

16. The method of claim 14, wherein the angle of the serrated pattern is determined by calculating an arctangent of a value dividing the depth of the serrated pattern into a half of the length of the serrated pattern.

17. The method of claim 14, wherein the angle of the serrated pattern is equal to or more than 45 degrees, and equal to or less than 60 degrees.

18. The method of claim 14, wherein the length of the serrated pattern is between 50 μm and 500 μm.

* * * * *